July 16, 1968     W. J. BRADY ET AL     3,393,318
IDENTIFICATION BADGE DOSIMETER
Filed Feb. 23, 1966                                           2 Sheets-Sheet 1

INVENTORS
William J. Brady
Garn K. Iverson

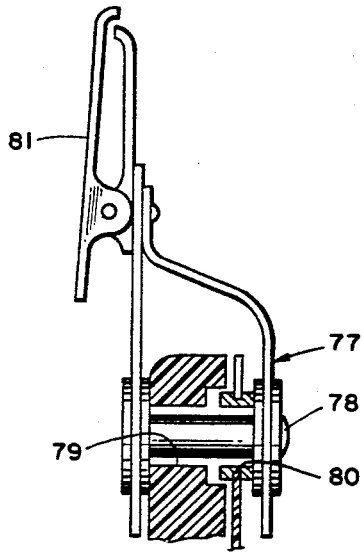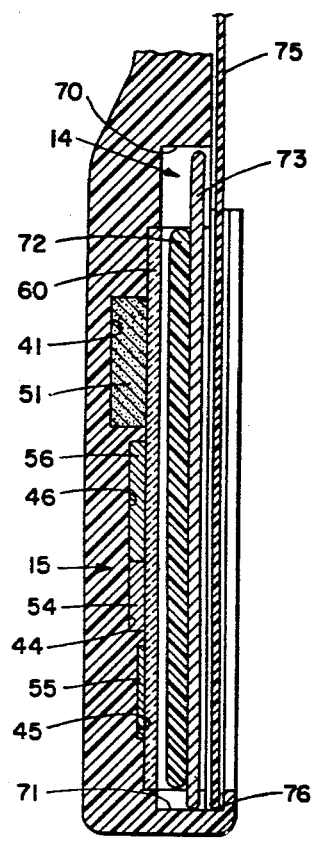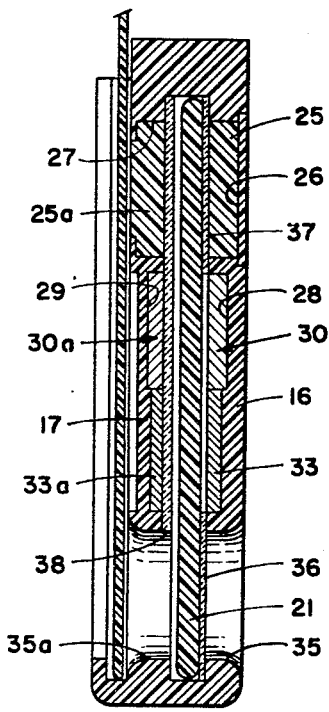
Fig. 4
Fig. 2
William J. Brady
Garn K. Iverson
INVENTORS United States Patent Office 3,393,318
Patented July 16, 1968

3,393,318
IDENTIFICATION BADGE DOSIMETER
William J. Brady and Garn K. Iverson, Las Vegas, Nev., assignors to the United States of America as represented by the United States Atomic Energy Commission
Filed Feb. 23, 1966, Ser. No. 531,327
4 Claims. (Cl. 250—83)

ABSTRACT OF THE DISCLOSURE

A film badge and credential holder for determining radiation exposure of a person subjected to different types of radiation comprising a first film sensitive to beta rays, gamma rays, X-rays, and thermal neutrons superimposed only over a portion of a second film sensitive to fast neutrons such that both films have outlying portions beyond the extremities of the other, said outlying portions of the first film disposed intermediate several pairs of radiation filters for affecting individual types of radiation such that the nature of radiation exposure may be discerned, and means for detecting high radiation exposure exceeding film saturation.

---

This invention relates to radiation monitoring devices and more particularly to a film badge for determining radiation exposures in multiple radiation fields.

With increased knowledge of radiation has come a greater understanding of the effects of the various types of radiation, such as, for example, not only alpha, beta, and gamma rays, but also fast neutrons and thermal neutrons. It is thus imperative to aquire, evaluate, and record the exposure to all types of radiation to which one is subject on a continuing and cumulative basis. Since long term safety is of paramount importance with all who are or who may be exposed to radiation, it is highly desirable to increase the overall efficiency and accuracy of radiation monitoring devices. This may be accomplished in at least two ways: (1) increase the monitoring capabilities to include multiple radiation fields, and (2) increase the ability of the monitoring device to record meaningful data.

Applicants' device provides the means for monitoring multiple fields of radiation, some of which have not been monitored heretofore by prior art devices. In each of four density measuring areas of the badge, applicants' have provided front exposure to back exposure equivalence, thus providing means for more reliable, accurate, and meaningful radiation exposure data.

It is customary, and it appears to be preferable, to combine a radiation monitoring film badge with a security credential holder. The holder serves the dual function of providing a container for various radiation monitoring elements and of displaying the security or identification badge of the wearer, which is generally required of one in an environment where radiation may be a problem. Several of the advantages of such a combination include (1) fewer items to control, i.e., a single item rather than two separate items, (2) greater compactness of components, and (3) greater monitoring accuracy because the device is always prominently displayed on the wearer's person and is checked by security inspectors before entrance to or exit from controlled areas is permitted.

Some prior art devices incorporate limited radiation monitoring capabilities with security credentials. Applicants have invented a new device which includes greater radiation monitoring capability than the prior art devices, which is of a simple, lightweight construction, and which functionally integrates the combination referred to previously. Included in the device is a provision for a personal identification plate. By providing in the housing a space or compartment for the plate, applicants have made it possible for a wearer to turn in the entire housing unit for radiation evaluation if required and to place the security identification badge in a new device immediately, thus eliminating expensive and time consuming work concern with keeping track of numbers, etc. Applicants' device includes means for determining gamma exposure, beta exposure, thermal neutron exposure, fast neutron exposure, and accidental criticality high-range dosimetry.

The beta particle is emitted from a nucleus during radioactive decay. It has a single electrical charge and a mass equal to $\frac{1}{1837}$ that of a proton. A negatively charged beta particle is physically identical to the electron. A positively charged beta particle is called a positron. Beta emitters are harmful if inhaled or ingested, and although beta particles may be easily stopped by a thin sheet of metal, beta radiation may cause skin burns.

Gamma rays are high-energy, short wave length electromagnetic radiations emitted by a nucleus. Gamma radiation usually accompanies beta emissions and always accompanies fission. Gamma rays are very penetrating and are best attenuated by dense materials like lead and depleted uraninum.

Neutrons are uncharged elementary particles comparable in mass to protons. A thermal or slow neutrol is a neutron in thermal equlibrium with its surrounding medium after having been slowed down by a moderator to about 2200 meters per second from the much higher initial speeds (and energy levels) of neutrons released by fissioning, or fast neutrons.

Applicants' device provides means for increasing the safety factor to the wearer by enabling more complete radiation information to be tabulated and recorded.

It is an object of this invention to provide a new combination film badge and security credential holder for determining radiation exposures in multiple radiation fields.

Another object of this invention is to provide, in a device of the character discussed, thermal neutron exposure determination by density differences in gamma equivalent filters.

Another object of this invention is to provide for improved discriminations of X-ray densities in beta exposure determinations by using a filter with low Z number, high mass material in conjunction with an open window area.

Another object of this invention is to provide front exposure to back exposure density equivalence in filter areas for improved exposure determination.

Another object is to provide a compact, separable film badge and security credential holder having a personal identification plate incorporated therein.

This specification, including the description, drawing, and claims, has been prepared in accordance with the applicable patent laws, and the rules promulgated under the authority thereof.

FIG. 2 is a sectional view taken along line 2—2 of FIG. 1 including the film;

FIG. 4 is a sectional view taken along line 4—4 of FIG. 1 including the film, I.D. plate, cover means and fastening means.

Figure 1:
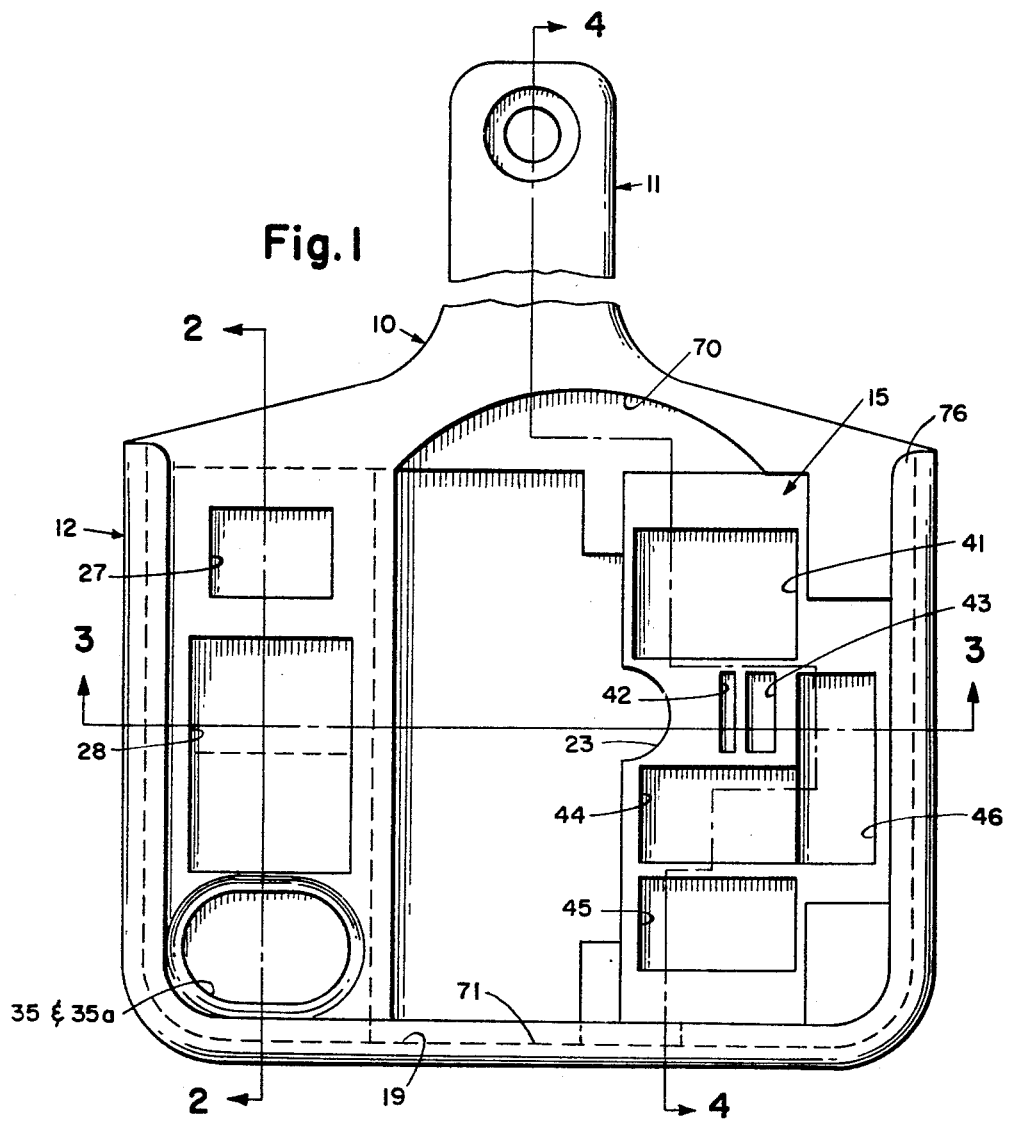
FIG. 1 is a plan view of the housing omitting the film.
Figure 3:
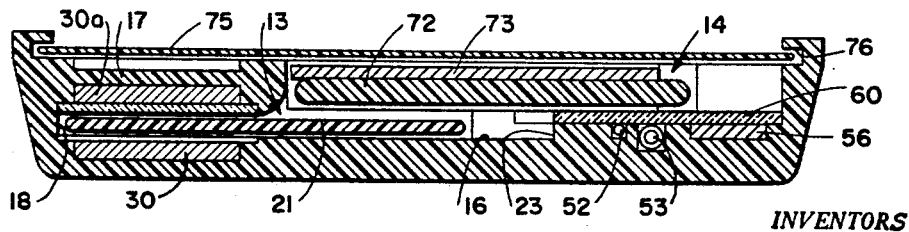
FIG. 3 is a sectional view taken along line 3—3 of FIG. 1 including the film, I.D. plate, and cover means.

The novel film badge and credential holder may comprise a housing 10 preferably made of a suitable material such as acrylonitrile-butadiene "Cycolac," and which may include an upper section 11 and a lower section 12. The lower section 12 may include two overlapping compartments 13 and 14 (see FIG. 3). Compartment 13, which may be partially enclosed by a rear wall 16, partition 17, side wall 18, and an end wall 19, may receive a beta-gamma-thermal neutron film pack 21, as shown in FIGS. 2 and 3. A semi-circular recess 23 may aid in removing film pack 21 by allowing insertion of an instrument, fingernail, or the like. The beta-gamma-thermal neutron film pack may be subject to filtering through at least four different media. Polytetrafluoroethylene filters 25 and 25a, commonly sold under the trademark "Teflon," may be carried in recess 26 in the rear wall 16 and in recessed aperture 27 in partition 17, respectively. Recesses 28 and 29 in the rear wall and partition, respectively, may receive filters 30 and 30A comprised of a relatively thick laminated plate of tantalum adjacent the film packet, and a backing layer, relatively thin, of cadmium, remote from the film packet. Contiguously disposed to the tantalum-cadmium filters, in the same recesses, filters 33 and 33a may be received. They may comprise plates of tantalum, whose thickness may be less than the combined thickness of the tantalum-cadmium filter 30, but greater than that of the tantalum alone. Windows 35 and 35a may extend through the rear wall 16 and partition 17, respectively. Relatively thin sheets of clear cellulose acetate commonly sold under the trademark "Tenite," 36 and 37, may cover window 35 and the "Teflon" filter 25, and a relatively thin sheet of clear "Tenite" 38, may serve to secure the various filters in their recesses in the partition. 17.

A compartment boss 15 may contain the criticality dosimeter components in a series of contiguously juxtapositioned recesses 41, 42, 43, 44, 45, and 46 set in the compartment boss. The components may include a pressed sulfur tablet 51, sealed with plastic for strength, received in recess 41, a glass fluorod or thermoluminescent rod 52 received in recess 42, a tantalum shielded glass fluorod or thermoluminescent rod 53 received in recess 43, a laminated, cadmium-indium-cadmium combination of plates 54 received in recess 44, an indium plate 55 received in recess 45, and a copper plate 56 received in recess 46. The boss 15 may be covered with a clear "Tenite" sheet 60 which maintains the components in their respective recesses.

The compartment 14 overlies parts of compartment 13 and compartment boss 15 and includes a partially circular recess 70 and a slot 71. The unshielded portion of film pack 21 and the top of the "Tenite" sheet 60 may comprise the rear wall of compartment 14. A fast neutron film pack 72 is received in compartment 14 adjacent to and overlying the rear wall of the compartment as defined by the film pack 21 and "Tenite" sheet 60. A personal identification plate 73 may then be placed in the compartment superimposed on the film pack 72 and may extend into circular recess 70 and the slot 71.

A top cover 75, which may comprise a security identification badge, and which may consist of plastic lamina, preferably fits in a slot 76 which may extend continuously around the sides and bottom of the lower section 12 of housing 10. The cover serves to maintain the identification plate and the fast neutron film packet in place, and to protect the various components inside the housing.

After assembly, any well known fastening means 77 may secure the cover 75 to the housing 10 such as by having clasp means 78 extend through contiguously disposed apertures 79 and 80 in the upper housing section 11 and cover 75 respectively. Spring clip means 81 may be adapted to secure the assembly to one subject to radiation exposure.

Ionizing radiations produce an effect on photographic film similar to that of light. When the film is developed after exposure to radiation, a blackening of the film may be observed. The density or extent of the blackening is a measure of the total amount of radiation to which the film has been exposed. This device incorporates two film packs, one, a beta-gamma-thermal neutron film pack for beta particles, gamma photons, X-ray photons, and thermal or slow neutrons, and a second film pack for fast neutrons.

In operation, gamma exposure may be determined from that part of the film means intermediate the tantalum filters. It has been determined that a 0.020 inch thick tantalum filter gives a substantially flat film response to gamma ray energies above 50 kev., and it is generally conceded that such a filter provides the best response curve of any single element filter.

Beta ray exposure may be determined from the part of the film intermediate the low Z number, high mass "Teflon" filters and the open windows. Beta particle penetration decreases with increasing density, and thus "Teflon," which has a comparatively high density, serves to attenuate beta particles. The "Teflon" filter area may be used with the tantalum filter area means to give density ratios, and then the ratios may be compared with that derived from the window areas since different gamma or X-ray energies give different ratios and different densities in the film. Net beta exposure may be determined by subtracting gamma, X-ray and thermal neutron open window densities in terms of dose, as derived from various ratios, from the total open window density in terms of dose.

X-ray determination is also facilitated with information from the "Teflon" area of the film. Beta penetration decreases with increasing density and X-ray penetration increases with decreasing atomic or Z number. Thus a material with a high density and low Z number, such as "Teflon," minimizes beta ray penetration to a film emulsion and also minimizes the attenuation of low-energy X-rays. Many other materials, such as aluminum, which is commonly used, stop beta particles and also stop low-energy X-rays which makes calculated results inaccurate. For comparative purposes, the density of Teflon is 2.2 grams per cubic centimeter and it has an effective Z number of 8, while aluminum has a density of 2.7 grams per cubic centimeter and it has an effective Z number of 13. Thus the "Teflon" has sufficient mass to stop beta penetration and yet it minimizes the attenuation of X-rays and therefore provides for superior accuracy in beta and X-ray discrimination.

The tantalum-cadmium filter area may be used in determination of thermal neutron exposure. Since the mass attenuation for the combination filter is essentially the same as that for the single tantalum filter, and the secondary electron production is essentially the same for the tantalum portions of the filters, the filters would therefore give the same density response to gamma energies over a wide range. The cadmium exhibits a high cross section for a neutron-gamma reaction in a thermal neutrol flux, and therefore the increase in density under the cadmium-tantalum filter is a measure of thermal neutron exposure. The additional density also allows the subtraction of extraneous film densities from the other filter areas and from the open window.

Calibrations show that for uniform doses normal to the filters, each filter area film density is approximately the same for beta, gamma, X-ray and thermal neutron radiation doses applied from either the front or the back of the holder. Applicants have solved two problems in accomplishing this density equivalence. First, masses of the beta-gamma-thermal neutron film packet materials from the outside of the packet to the sensitive film component emulsion and their secondary electron production characteristics are not the same from the front and the back of the packet. To overcome this, materials may be added between the filters and the film packet that have densities and secondary electron production characteristics similar to the differences in film packaging materials from the front and the back of the packet to the sensitive emulsion. The open window and "Teflon" filter areas in the back have also been somewhat modified. The second problem, occurring to prior art devices, is that when the holders will accommodate them, fast neutron film packets are placed either in front of or behind the beta-gamma-thermal neutron film packets. This magnifies the first problem.

The difficulty may be overcome by offsetting the fast neutron packet from the filter areas.

Fast neutrons produce tracks due to recoil protons and determination of fast neutron exposure may be made by conventional proton recoil track counting procedures. That is, the fast neutron film is examined microscopically and the tracks are counted by a technician. This, of course, differs from the beta-gamma-thermal neutron film, which may be analyzed by optical density measuring equipment.

The various films have only limited capability for quantitatively measuring radiation. Thus in event of an accident involving very high exposures the film would not indicate the extent of radiation absorbed, and it therefore becomes necessary to provide criticality dosimeter components which have much higher monitoring capabilities than does film. Criticality dosimetry for neutron and gamma radiation is accomplished by standard activation analysis to determine the extent of radioactivity.

The construction of the holder allows the use of the security credential in a functional manner, and yet it provides a simple method for removing the credential when the badge is turned in for analysis and radiation determination. The credential may then be used as the cover for a newly issued radiation monitoring badge. Owner or user identification is provided for in an efficient and inexpensive manner through the use of the identification plate which preferably stays with the monitoring badge. After the security credential is transferred to a new badge, or a new film packet is installed in the same housing, rapid and accurate identification of the owner of the exposed badge may be made by using the plate to stamp information on an IBM card which has the prerecorded and keypunched film number. If desired, exposure evaluation information may be keypunched into the card as part of an automated exposure reporting system.

Thus applicants have invented a novel combination film badge and security credential holder which is simple and inexpensive and yet which provides means for the accurate determination of various types of radiation, and which integrates a security credential and an identification plate with the other elements into a functionally united combination.

We claim:

1. A film badge and credential holder for determining radiation exposures in multiple radiation fields comprising, in combination, a housing having a rear wall with an opening therein for retaining a polytetrafluoroethylene filter member and surrounded by forwardly projecting marginal portions three of which are provided with inwardly projecting ridges together forming an open-ended substantially U-shaped slot for receiving and removably retaining an identifying badge cover, wall portions projecting from said rear wall forming a first compartment occupying about one-half the area of said rear wall for retaining against the rear wall and overlying said filter member a film for determining beta-gamma-X-ray-thermal neutron exposure, a partition extending along one of said marginal portions and overlying about one-half the area of said first compartment and film having an aperture for retaining a polytetrafluoroethylene filter member in overlying relation to said film, additional wall portions projecting from said rear wall forming a plurality of contiguous recesses each disposed in substantially the same plane with said first compartment for retaining discrete radiation monitoring components, further wall portions projecting from said rear wall forming a second compartment coextensive with about one-half the area of said first compartment and with said plurality of recesses for retaining a fast neutron determining film in overlapping relationship with said discrete components and with only about one-half of said first mentioned film and for retaining an identification member, and a portion projecting from said housing intermediate said U-shaped slot having an aperture therethrough for receiving a fastening member and interlocking the identifying badge cover in said U-shaped slot.

2. The film badge of claim 1 wherein said rear wall is provided, adjacent said opening, with indentations, said partition is provided with recesses disposed adjacent said aperture and opposite said indentations of said rear wall for retaining tantalum filter members disposed one in one of said indentation and one in one of said partition recesses and for retaining tantalum-cadmium filter members each of thickness exceeding that of one of said tantalum filter members oppositely disposed in another of said indentations and partition recesses, said tantalum filters each of thickness exceeding the tantalum portion of said tantalum-cadmium filter member.

3. The film badge of claim 1 wherein said additional wall portions includes an arcuate end adjacent said first compartment for facilitating access thereto.

4. The combination of claim 1 in which the discrete radiation monitoring components comprise a glass fluorod, a glass fluorod having a tantalum shield, a pressed sulfur tablet, a copper plate, an indium plate interposed between two layers of cadmium filter, and an indium plate.

References Cited

UNITED STATES PATENTS

| 2,938,121 | 5/1960 | Fitzgerald et al. | 250—83 |
| 3,053,983 | 9/1962 | Faulkner et al. | 250—83 |
| 3,130,306 | 4/1964 | Storm et al. | 250—83 |

FOREIGN PATENTS

| 1,082,351 | 5/1960 | Germany. |
| 1,384,649 | 12/1964 | France. |

RALPH G. NILSON, *Primary Examiner.*

A. B. CROFT, *Assistant Examiner.*